United States Patent
Meller et al.

(10) Patent No.: US 9,062,165 B2
(45) Date of Patent: Jun. 23, 2015

(54) DUCTILE EXPANDED POLYESTERS HAVING HIGH IMPACT RESISTANCE

(75) Inventors: Mika Meller, Jarvenpaa (FI); Jie Li, Zofingen (CH); Horst Gräter, Muenster (DE)

(73) Assignee: ARMACELL ENTERPRISE GMBH & CO. KG, Schoenefeld OT Waltersdorf (DE)

( * ) Notice: Subject to any disclaimer, the term of this patent is extended or adjusted under 35 U.S.C. 154(b) by 174 days.

(21) Appl. No.: 13/103,602

(22) Filed: May 9, 2011

(65) Prior Publication Data

US 2011/0274554 A1 Nov. 10, 2011

(30) Foreign Application Priority Data

May 7, 2010 (EP) .................................... 10162248

(51) Int. Cl.
C08L 67/03 (2006.01)
C08J 9/00 (2006.01)
C08L 67/02 (2006.01)
C08L 23/08 (2006.01)

(52) U.S. Cl.
CPC ............ C08J 9/0061 (2013.01); *C08J 2367/02* (2013.01); *C08J 2423/08* (2013.01); *C08L 23/0869* (2013.01); C08L 67/02 (2013.01)

(58) Field of Classification Search
CPC ...... C08J 9/0061; C08J 2467/02; C08L 67/02
USPC ....................................................... 525/165
See application file for complete search history.

(56) References Cited

U.S. PATENT DOCUMENTS

| | | | |
|---|---|---|---|
| 4,870,110 A * | 9/1989 | Mehra et al. | 521/46.5 |
| 2003/0135015 A1 | 7/2003 | Fujimaki et al. | |
| 2004/0001946 A1 * | 1/2004 | Ma et al. | 428/317.9 |
| 2004/0259839 A1 * | 12/2004 | Patel et al. | 514/54 |
| 2006/0173133 A1 * | 8/2006 | Flexman et al. | 525/191 |
| 2007/0299212 A1 * | 12/2007 | Smillie | 525/425 |
| 2008/0214723 A1 * | 9/2008 | Moulinie | 524/539 |

FOREIGN PATENT DOCUMENTS

| | | |
|---|---|---|
| EP | 2048188 A1 | 4/2009 |
| EP | 2343330 A1 | 7/2011 |

OTHER PUBLICATIONS

J. Throne et al.: "Closed-Cell Foam Behavior Under Dynamic Loading—III. Impact Loading of High. Density Foams," Journal of Cellular Plastics, vol. 21, 1985, pp. 123-140.
J. Scheirs et al.: "Additives For The Modification Of PET," Modern Polyesters, John Wiley & Sons Ltd., 2003, pp. 506-515.
L.A. Ultracki: "Commercial Polymer Blends," Chapman & Hall, 1998, 1 page.
EP application No. 10150497.5 filed Jan. 12, 2010, 18 pages.
W. Michaeli et al.: "Analysis of the Impact Properties of Structural Foams," Journal of Cellular Plastics, vol. 45, Jul. 2009, pp. 321-351.
L.A. Ultracki: "Commercial Polymer Blends," Chapman & Hall, 1998, 3 pages.
R. Gendron: "Thermoplastic Foam Processing—Principles and Development" CRC Press, 2005, 3 pages.

* cited by examiner

*Primary Examiner* — Mark Kaucher
(74) *Attorney, Agent, or Firm* — Rothwell, Figg, Ernst & Manbeck, P.C.

(57) ABSTRACT

This invention relates to expanded polyester materials comprised of polyester/acrylic elastomer blend having an improved ductility and impact resistance, while the compression strength, shear strength/modulus of polyesters remain almost unchanged or unworsened. Addition of a non-reactive/reactive acrylic mixture serving as the blend partner improves the melt strength in an expanding process and leads to a better impact resistance of expanded aromatic polyester materials. All expanded polyester materials are produced with help of a reactive process.

9 Claims, No Drawings

DUCTILE EXPANDED POLYESTERS HAVING HIGH IMPACT RESISTANCE

This invention relates to expanded polyester materials comprised of polyester/acrylic elastomer blend having an improved ductility and impact resistance, while the mechanical strength of polyesters remains almost unchanged or unworsened. An addition of a non-reactive/reactive acrylic mixture serving as the blend partner improves the melt strength in an expanding process and leads to a better impact resistance of expanded aromatic polyester materials.

BACKGROUND OF INVENTION

Polyester materials, particularly polyethylene terephthalate, exhibit a very high mechanical strength (compression/shear strength and modulus) and an excellent temperature resistance, but behave brittle, very often characterized by poor values of shear elongation at break and low impact strength. The brittleness of the polyesters confines its application, it often makes such applications impossible where for example a highly periodic mechanical loading occurs and/or polyesters need to be thermoformed to 3D articles and/or mechanical post-processes like screwing, nailing or bending are necessary.

Impact resistance is the ability of a material to resist breaking under a shock loading or the ability of a material to resist fracture under stress applied at high speed. Polyester materials, particularly aromatic polyethylene terephthalate are typically poor in impact resistance and break easily under shock loading. The free-fall impact testing of a foamed PET having a density of about 100 kg/m$^3$ according to ASTM F1292, for instance, demonstrates relatively high values of g-max and HIC (Head Injury Criteria) (s. comparative example 1).

In a report of Throne (Throne, J. L., et al., Journal of Cellular Plastics, 21 (1985) 2, 123-140) the impact properties of structural foams of some thermoplastics were studied and the testings found no apparent correlation of impact properties with the foam density. Therefore, it is not expected that foamed polyesters with low density provide automatically a better impact strength.

The ductility and flexibility of an expanded polyester material are also limited: Currently, foamed polyester with a density of approximately 110 kg/m$^3$ has a shear elongation at break of about 3% (according to ISO 1922), with compression strength values of 1.2-1.4N/mm$^2$ (according to ISO 844).

A foamed polyester with a lower density such as approximately 100 kg/m$^3$, as a further example, shows very often a shear elongation at break lower than 5%. At this density level, the compression strength is about 1.0N/mm$^2$. On the contrary, some competitive materials show a much better ductility, e.g. foamed PVC with a density of 75-85 kg/m$^3$ possesses a shear elongation at break of approximately 20% with compression strength of approximately 1.3N/mm$^2$.

An expanded polyester with advanced ductility and impact resistance improves the thermoformability and imparts a better fatigue behaviour of end product. However, an improvement of material ductility often results in decrease of mechanical strength or/and rigidity of a thermoplastic polymer. Increase of ductility and flexibility while maintaining the mechanical strength/rigidity is a challenge in material science.

The overall objective of this invention is to develop and provide expanded polyester materials with a very high compressive strength and a high shear modulus, but with a minimum possible brittleness. This means that sufficient shear elongation is needed to target a widespread application of polyester materials, particularly used as a core material in a sandwich structure, where very particularly a dynamic loading occurs. Furthermore this can be used as an insulation material with excellent compatibility to construction materials, e.g. concrete, excellent mounting properties, e.g. for screwing or nailing. Such expanded materials should for instance be in position to resist a shortterm resin treatment up to 180° C. without any suffering from the mechanical strength afterwards, can be much better thermoformed to thick 3D articles, structurally integrated into building materials and exposed to periodic mechanical loading.

Elastomeric compounds are generally used as impact modifiers for polyesters in traditional thermoplastic processes. The effectiveness of the impact modification is highly dependent on:
- the modifier type
- the modifier content
- the modifier particle size
- the interparticle distance The elastomeric modifiers can be divided into non-reactive and reactive groups. The most non-reactive elastomeric modifiers such as general purpose rubbers are not highly effective at polyesters because they are unable to adequately interact with the polyester matrix. The poor interaction of the non-reactive modifiers with the polyester matrix is the main reason for the fact that optimally sized dispersed phases and strong interfacial bonding can not be achieved.

It is known from the literature (Sheirs, J., et al., Modern Polyesters, John Wiley & Sons Ltd (2003)) that the use of reactive compatibilization supports small dispersed elastomeric particles and a small interparticle distance to obtain a finely sized dispersed phase in polyester matrix, whereas reactive impact modifiers are grafted to polyester matrix. Reactive impact modifiers have functionalized end groups, which bond the impact modifier to the polymer matrix and moreover modify the interfacial energy between the polyester matrix and the impact modifier for enhanced dispersion.

Typical and commercially available reactive elastomers such as ethylene-ethyl acrylate-glycidyl methacrylate terpolymer (EEA-GMA), ethylene-butyl acrylate-glycidyl methacrylate terpolymer (EBA-GMA), ethylene-vinyl acetate-maleic anhydride (EVA-MA) and styrene-ethylene butylenes-styrene-maleic anhydride (SEBS-MA) have functionalized/reactive end groups of glycidyl methacrylate (GMA) or maleic anhydride (MA). These end groups are responsible for grafting of said elastomers to polyester matrix by a chemical reaction with carboxyl acid and hydroxyl end groups of the polyester resins.

Expanding of polyesters is nowadays more and more practiced by a reactive process comprising upgrading or increasing of molecular weight and extensional viscosity of aromatic polyester resins during the extrusion process with help of chain-extenders such as multifunctional tetracarboxylic dianhydrides.

The inventors of US 2003/0135015 A1 (Fujimaki, T.) mention in the description that, beside other thermoplastic materials, polyethylene acrylate resins, which are acrylic elastomers also acting as thermoplastic elastomeric modifiers, can be used as carrier material in the composition of a polyfunctional masterbatch. The epoxy-containing masterbatchs increase the molecular weight of polyesters and reduce the MFR. As a result, highly foamed materials can be produced. However, polyethylene acrylate resins apply as elastomeric modifiers in polyester foams were neither discussed in the description, nor supported by the examples.

The invention EP 2 048 188 A1 (Severini, T.) describes the use of acrylic elastomers as carrier material in a masterbatch formulation to increase the flexibility of foamed PET having a density around 130 kg/m³. An addition of such masterbatch containing PMDA (chain-extender) and acrylate leads to a better value of shear elongation at break (ranging from 17% to 25%). However, the application of this kind of masterbatch for an improvement of flexibility is limited in terms of composition constraint: An individual dosing of the acrylic elastomer for a requested value of material flexibility or for processing of different polyester grade is not possible because of a fixed need of PMDA in process. A higher or lower dosing of PMDA in the final composition of polyester process may results in a cell structure or foam properties which are not useful. As a result, a new masterbatch has to be developed for every individual application. Moreover, the influence of the acrylic elastomers on the stiffness of foamed polyesters is neither understood nor examined: The results of comparative and innovative examples are not comparable due to an absence of PMDA in the composition of the comparative examples. The better values of compression strength and shear modulus shown in the innovative examples are obviously resulted from chain-extending reaction of PMDA with PET during the foaming process. In addition, the impact resistance of PET foam produced with the help of the masterbatch containing the acrylic elastomers is neither evident nor of interest in said invention.

The acrylic elastomers are in general thermoplastic copolymers containing an acrylate content from 3 to 50% by weight and having a melt flow index from 0.1 g to 200 g/10 min. at 190° C./2.16 kg (according to ISO 1133). The acrylic elastomers can be divided into groups of 1) non-reactive acrylate copolymers and 2) reactive acrylate copolymers. Typical non-reactive copolymers are e.g. ethylene-ethyl acrylate copolymer (EEA), ethylene-butyl acrylate copolymer (EBA) and ethylene-methyl acrylate copolymer (EMA), while the reactive copolymers are cited above.

However, application of the reactive modifiers in a reactive expansion process is difficult, if not even impossible. Until now it was rarely reported for the characteristic reasons of such expanding process and limitation of such reactive modifiers. These reasons are described below:

1. It is acknowledged in the literature (Sheirs, J., et al., Modern Polyesters, John Wiley & Sons Ltd (2003)) that the amount of a reactive and/or non-reactive modifier required to achieve significant advantages from a mechanical point of view must range from 20 to 30% by weight of polymer matrix. During an expansion process like foam extrusion, a free expansion of the melt system containing physical blowing agents is applied, which is extremely sensitive to nucleation and melt strength. Any disturbance of nucleation and reduction of melt strength leads to formation of a poor and unacceptable cell structure during the free expansion. Addition of said modifiers in a high amount is thus not advantageous due to disturbance of nucleation and reduction of melt strength.

2. It is also perceived that reactive elastomeric modifiers exhibit high reactivity with polyesters, resulting in a chemical reaction with the functional end groups of polyester. This kind of reaction relates to lowering of the concentration of the functional groups of polyesters and causes an effect reduction of necessary polymer chain-extending enhancement, which is very essential for a reactive expanding process of polyesters.

3. Moreover, it is well-known that the use of elastomeric modifiers improves the flexibility, but worsens the modulus values of polyester products. Both properties are important for composite applications.

DESCRIPTION OF INVENTION

One of the most cost-effective pathways to improve material performance is to use polymer blends instead of a single kind of a polymer. Polymer blending is applied to modify the properties of one polymer by adding a second thermoplastic material.

A polymer blend is defined as a mixture of two or more polymers. According to the literature (Ultracki, L. A., Commercial Polymer Blends, Chapman & Hall (1998), Gendon, R., Thermoplastic Foam Processing—Principle and Development, CRC Press (2005)), the term "polymer blend" is restricted to systems comprising at least 2 wt % of the second polymer. Below this level, the second phase is considered to be an additive. Usually, blending polymers is used to compensate a specific weakness of a given primary material.

In the current invention, polyesters are melt blended with 2-20 wt % of a reactive or non-reactive acrylic elastomer or a mixture thereof. The polyester/elastomer blend is fed into an (preferably twin-screw) extruder and dispersed with a multifunctional compound, a blowing agent and a nucleate. The mixture undergoes an upgrading process in the extruder which increases the molecular weight of the polyester matrix and thus the extensional viscosity. At the same time a grafting of the reactive acrylic elastomer with the polyester end groups takes place and a dispersion of the modifiers in the polyester matrix is carried out. The polymer blend is then processed to low-density expanded materials under a high melt pressure.

The multifunctional compound used in this invention is a high-concentrate masterbatch containing reactive chain-extending ingredients (for example tetracarboxylic dianhydride) as disclosed in EP application number 10 150 497.5 (2010) (Li, J.), which reacts with carboxyl and hydroxyl end groups of polyesters. Through this kind of chemical reaction, the molecular weight of polyesters is significantly increased. In application of such masterbatch, the influence of the thermoplastic wax on the melt strength of the polymer blend is neglectable during the expanding process and the impact of the wax on the properties of the final products is insignificant, as the content of the wax is very low in the final formulation of the expanded material. Even in case of an increased quantity of the masterbatch required for an expansion processing of post-consumer or low viscosity PET resins, the influence of the wax is neglectable.

The acrylic elastomers used in this invention are polar ethylene-acrylate copolymers selected from a group of ethylene-acrylic ester copolymer or ethylene-acrylic ester-reactive monomer terpolymer, where the acrylic ester is an alkyl or isoalkyl acrylic with alkyl or isoalkyl radical containing 1 to 6 carbon atoms, preferably ethyl, methyl or butyl acrylate, while the reactive monomer is selected between maleic anhydride (MA), glycidyl methacrylate (GMA) or a mixture thereof.

Preferred ethylene-acrylate copolymers are ethylene butyl acrylate (EBA), ethylene ethyl acrylate (EEA), ethylene methyl acrylate (EMA), ethylene/acrylic ester/maleic anhydride terpolymer (EEAMA), ethylene-ethyl acrylate-glycidyl methacrylate terpolymer (EEA-GMA), ethylene-butyl acrylate-glycidyl methacrylate terpolymer (EBA-GMA) or a mixture thereof. An ethylene-acrylate copolymer containing an acrylate content from 3 to 50% by weight and having a melt flow index from 0.1 g to 200 g/10 min. at 190° C./2.16 kg (according to ISO 1133) is applied in the current invention. In case of reactive acrylic modifier, 2-20 wt % of MA or GMA remain additionally in the ethylene-acrylate elastomer.

Based on the knowledge that the ethylene-acrylate copolymers exhibit high thermal stability (up to 350-400° C.) and resins of the ethylene-acrylate copolymers are classified as non-sticky pellets, this kind of elastomeric modifiers can be processed easily as a blend partner of polyesters without any sticking or bridging despite their low melting point (90-100° C.).

It is also possible to extend the use of the ethylene acrylate copolymer modifier to ethylene acetate copolymer, wherein the component of acrylate is replaced by acetate. The non-reactive or reactive acetate elastomer should provide an improvement of ductility and impact resistance of polyester resins due to the good flexibility and the excellent compatibility of the acetate elastomer with polyesters. However, the thermostability of acetate copolymer is not as good as the one of acrylic elastomers.

It has now been found out that the polyester/acrylic elastomer blend can be processed even in a small amount (below 20 wt %) of acrylic elastomer to significantly improve elongation properties of expanded polyester manufactured by a reactive expansion process. The achieved ductility improvement can easily excess 15% of shear elongation at break even at a density around 100 kg/m$^3$ of expanded materials. An expanded polyester containing the reactive acrylic modifier provides even a better value than the polyester material having a non-reactive acrylate copolymer: The value 20% of shear elongation at break is exceeded quite simply.

It has also been surprisingly found that blending of a reactive acrylic elastomer with polyesters does not significantly impair the reactive expansion process, in which a multifunctional compound is applied which reacts with hydroxyl and carboxyl end groups of polyesters. It is possible to produce expanded polyester materials containing reactive acrylic elastomers and having excellent elongation values. The reactive processability of said blend containing reactive acrylic elastomers and the significant improvement of product ductility and flexibility are probably related to the fact that:

1. up to a certain quantity of reactive modifying component, there are still sufficient quantities of hydroxyl and/or carboxyl end groups of the polyester available for an upgrading reaction with the multifunctional compound due to the small amount of reactive acrylic elastomers used in the expanding process and 2. addition of reactive acrylic elastomers in a small amount is sufficient for ductility and toughness improvement based on their grafting reaction with polyesters and the reaction-related uniform/fine dispersion.

However, even though better elongation properties of expanded polyester materials are imparted by addition of a non-reactive or a reactive acrylic elastomer as blend partner into the composition, the stiffness and rigidity of such impact-modified polyesters, which are important for many composite applications, are worsened with decreased values of strength and modulus. Additionally, the melt pressure decreases with blending of an acrylic elastomer, particularly with a reactive acrylate (s. Tab. 2 of examples below). The decrease of the melt pressure is directly in correspondence with weakening of the melt strength, which is part of the reasons for coarse cell structure of expanded polyesters and thus for a worse rigidity.

A further embodiment of the current invention is to use an acrylic synergy system comprised of a mixture of a non-reactive and a reactive acrylate copolymer, whereas the reactive modifier takes 15-40 wt % share of the mixture. The acrylic synergy system is added into the recipe in amount of less than 20 wt % relating to the overall composition.

It has been unexpectedly found that melt blending of the acrylic synergy system with polyesters leads to an increase of melt strength during a reactive expanding process, wherein the melt strength enhance occurs in form of a rise of melt pressure (s. Tab. 2 of examples below). The synergy blend partner acts thus as a melt strength enhancer to polyesters in amount of 2.5 to 7.5% by weight of the overall composition. This effect of melt strength enhancement has not been found in the blend composition containing either non-reactive or reactive acrylic modifier applied separately. The melt strength enhancement was also confirmed in further repeat trials with the mixtures of non-reactive and reactive acrylate copolymers.

It has been furthermore found that the use of polyester/acrylic synergy system blend increases the elongation properties, while the rigidity and stiffness (strength and modulus values of compression or shear) remain almost unchanged or slightly increased. Particularly important is the achievement of a better impact strength (according to ASTM F1292) which expanded polyester materials containing an acrylic synergy mixture can reach. The improved elongation and the retention of rigidity of expanded materials can be achieved by incorporation of the non-reactive/reactive acrylate mixture in an amount of at least 2.5 wt % (s. Tab. 3 of examples). The best values of impact strength were measured at the expanded polyester sample with 5.0 wt % acrylic synergy mixture.

The additional retention of the material rigidity is probably resulted from:

the grafting of the reactive acrylate copolymer with hydroxyl and carboxyl end groups of polyester which is responsible for 1) a better dispersion of modifier particles in polyester matrix and 2) an improved interparticle/interfacial adhesion and the increase of the melt strength of polyesters, which is unexpectedly induced by addition of the acrylic synergy system, at least partially acting as a melt strength enhancer, and therefore beneficial for a visible refinement of cell size.

The improvement of the ductility and impact strength of the expanded polyesters is obviously achieved by the homogenously dispersed, fine elastomeric domains in the polyester matrix and the elastomeric nature of the modifiers. The improved dispersion of the acrylic synergy system in polyester matrix contributes apparently to a higher interfacial and interparticle adhesion. This adhesion influences probably also the crystallinity of polyester resin and/or the modifiers. To fully understand the melt strength enhancement of aromatic polyesters through the non-reactive/reactive acrylic mixture, more morphological investigations are necessary, as the foam morphology strongly affects the failure mode of thermoplastic materials.

To characterize the impact properties of polyester compositions, an impact testing must be conducted and carried out. The impact testing is divided roughly into pendulum, free falling weight and puncture method. In comparison to other mechanical tests, the characterization of impact properties requires the use of a large number of samples to gain an even approximate measurement of the material behaviour.

According to the literature (Michaeli, W., et al., Journal of Cellular Plastics, 45 (2009) 4, S. 321-351) and confirmed by testings of the present invention, using Charpy (ISO 179) and Izod (ISO 180) testings, which belong to pendulum method, samples can be impacted flatwise or edgewise. The testing results, in both directions, present a big deviation and no reproducible testing can be carried out. The energies measured with help of an instrumented puncture tests had comparatively low values of standard deviation, but this kind of tests was quite expensive.

In the current invention, a free-fall impact test method according to ASTM F1292 was employed. The method was low-priced, but provided reproducible testing results with a low deviation and characterized the impact resistance of impact-modified polyester foams. This testing was originally established for surface materials which needed to be reviewed for minimum impact attenuation requirements on playground surfaces.

The test method quantifies impact resistance in terms of g-max and HIC scores. G-max is the measure of the maximum acceleration (shock) produced by an impact. The head injury criterion or HIC score is an empirical measure of impact severity based on published research, describing the relationship between the magnitude and duration of impact accelerations and the risk of headtrauma. The lower the values of g-max and HIC are, the better is the impact strength, the higher is the absorption of impact energy and the safer is the material.

Every sample underwent a series of 3 falling testings with help of a rigid missile of specified mass having a hemispherical surface of specified radius: The first falling impact provided the value of maximum acceleration g-max and head injury criteria HIC, while the 2nd and 3rd impacts built the base for the value of average g-max and average HIC. The missile from a drop height of 60.96 cm (2 feet) was used at a temperature of 25° C. to impart an impact to a surface of samples which were 35 mm thick. The drop height of said impact test was defined as the vertical distance between the lowest point of the elevated missile and sample surface.

The impact resistance of expanded polyester samples without modifier or with the non-reactive/reactive mixtures was measured according to ASTM F1292 and with help of the procedure specified above. The results (s. Tab. 4 of examples) show lower values in g-max, HIC, average g-max and average HIC of expanded polyester materials containing the acrylic synergy mixture in comparison with the expanded sample without any modifier.

The claimed polyester material contains at least one of acrylic elastomers in a small amount (below 20 wt %), which significantly improves elongation properties of expanded polyester to minimum 15% of shear elongation at break at a density lower than 110 kg/m$^3$.

The claimed polyester material furthermore contains an acrylic synergy system comprised of a mixture of a non-reactive and a reactive acrylate copolymer, whereas the reactive modifier takes 15-40 wt % share of the mixture. The melt blending of the acrylic synergy system with polyesters leads not only to an increase of melt strength during a reactive expanding process, but also to a retention or even a slight increases of the already excellent rigidity and stiffness (strength and modulus values of compression or shear) of polyesters. The shear elongation is additionally improved significantly in comparison to the expanded polyesters containing no acrylic elastomer. Particularly important is the better impact strength (according to ASTM F1292) achieved by the claimed polyester material. The claimed polyester material with a density around 100 kg/m$^3$ (s. innovative examples 2 to 7) e.g. is characterized by a shear elongation at break higher than 15% (according to ISO 1922), a maximum acceleration g-max lower than 93 and a head injury criteria HIC lower than 316 (according to ASTM F1292).

A very beneficial advantage of the claimed material is the fact that the claimed expanded polyester is designed to be rigid, strong and highly temperature-resistant, but still flexible enough. The outstanding combination of the high temperature resistance, the mechanical strength and flexibility of the claimed material allows a) a shortterm resin treatment at a temperature up to 180° C. which is necessary for production of sandwich articles (e.g. rotor blade) and b) an application with a periodic, dynamic loading (e.g. windmills, wagon building, aviation panels and floors in construction). For such applications, the light-weight material is manufactured by resin defusing, RTM, coating or lamination to core material in a sandwich structure. This structure has a high structure strength to resist to mechanical load or to transform the force, at the same, the claimed material as core component provides an excellent fatigue behavior of the material and/or energy absorption the dynamic loading or vibration requires.

Another advantage of the claimed material is the fact that this material can be applied in areas where impact loading may occur, e.g. wall panels or floors in wagon or aviation or construction.

The improved ductility in combination with the highly thermal stability of the claimed material leads to another advantage which is the fact that the claimed material can be easily thermoformed to thick 3D articles without a material fracture. This widens the application of claimed material to be used as furniture, submarine, caravan or automotive parts for instance which can be manufactured in less process steps than before. The mechanical strength, impact damping, sound insulation and vibration absorption are often required in such application.

Another important advantage of the claimed material is the fact that an impact-modified expanded polyester with low density contributes to sufficient insulation and provides the structural integrity as construction material. This means that the claimed material is mechanically strong and tough enough to bear weight, impact, stress, torsion, etc. It is desirable to achieve the most economic and ecologic possible constructions as well as mounting problems or material loss by scrap are prevented, which occur in case of brittle materials like polystyrene or polyurethane, due to the better ductility.

The impact and ductility modification of polyesters leads to the further advantage which is the fact that the claimed material can be mounted in a structural integrity with help of drilling, screwing, nailing or bending without fracture problems. This is very important in building industry.

In expansion processes, a physical or chemical blowing agent is preferably used for expansion and the physical blowing agent is typically carbon dioxide (CO2), Nitrogen (N2), ketons, hydrofluorocarbon, a hydrocarbon (such as n-hexane, n-octane, iso-butane, isopentane, cyclopentane and n-heptane) or a gas mixture of above gases. A nucleate is generally applied in the expansion process, whereas commonly used nucleate types are talc, TiO2, MgO, BaSO4, SiO2, Al2O3, CdO, ZnO, mica filler, fluor polymers, diatomaceous earth or the like alone or in combination.

Beside nucleation and blowing agents, it is also possible to additionally use further additives such as process/thermal stabilizers, fluor-polymers, UV stabilizers and flame retardants etc. in the recipes. Representative flame retardants are for example halogen-containing (like polybrominated diphenyl ethers or others), charforming (like phosphorus-containing or others) or water-releasing (like zinc borate or others) compounds or mixtures thereof.

The result of the application of said acrylic modifiers is obvious in all expanding processes of thermoplastic polymers (e.g. blow molding, batch process, injection molding or sheet/tube extrusion for a later thermoforming), but the focus is on reactive foam extrusion to process a wide range of aromatic polyesters. The process of foaming aromatic polyesters is generally foam extrusion, wherein profile, annular, multihole and flat dies can be applied to form an extrudate into a required final shape.

Preferred aromatic polyesters for production of cellular foamed products include those derived from terephthalic acid, isophthalic acid, naphthalenedicarboxyl acid, cyclohexanedicarboxylic acid and the like or the alkyl esters. Particularly preferred is DMT- or PTA-based PET with I.V. of about 0.4-1.4 dl/g (according to ASTM 4603) including homo- and copolymer.

A process of foaming virgin polyester resins, post-consumer polyester materials or a mixture thereof (to increase for instance the overall molecular weight) in form of granules, agglomerates, powders or flakes is also possible by applying anyone of said elastomeric modifiers. The term "post-consumer" is defined as material being brought back into the process—i.e. being recycled—after its prior processing and/or use, e.g. as PET bottles, PET articles, polyester scraps, recycling polyesters.

EXAMPLES OF THE INVENTION

This invention is illustrated by the following examples given for illustrative purpose and not to be regarded as limiting the invention or the manner in which it can be practiced.

To characterize the properties of expanded polyesters, the density was measured according to ISO 845, compression values in accordance with ISO 844 and shear values in compliance with ISO 1922. The impact resistance of the sample was investigated with help of impact testing method as described above in "Description of Invention" and according to ASTM F1292.

Example 1

Comparative Example

A co-rotating twin-screw extruder having a screw diameter of ⌀ 75 mm and L/D=32, followed by a static mixer and a strand die, was applied to produce foam boards. The foam extrudate underwent a calibration after leaving the strand die to be shaped to a rectangular board.

PET copolymer (I.V.=0.78 dl/g) was dried at 165° C. for 8 h and a high-concentrate masterbatch disclosed in EP application number 10 150 497.5 and comprised of PMDA, sterically hindered phenolic antioxidant and EAA at 80° C. for 8 h. The PET resin together with the high-concentrate masterbatch in an amount of effectively 0.28 wt % PMDA, 0.08 wt % sterically hindered phenolic antioxidant and effectively 0.3 wt % of a nucleating agent each by weight of the mixture was continuously extruded and foamed at a throughput of 40 kg/h. The mixture was extruded and a free expansion took place with help of cyclopentane acting as blowing agent. The process parameters are presented in Tab. 1:

TABLE 1

| Process parameters | |
|---|---|
| Feature | Parameter |
| Temperature of feeding zone (° C.) | 120-170 |
| Temperature of melting zone (° C.) | 280-285 |
| Temperature of metering zone (° C.) | 275-285 |
| Temperature of static mixer (° C.) | 265-280 |
| Temperature of die (° C.) | 280-290 |
| Throughput (kg/h) | 40 |
| Gas injection (g/min) | 17.5 |

The extrusion process was stable and a produced PET foam with a fine and uniform cell structure was obtained at a foam density about 100 kg/m³. The resin/blend composition and the melt pressure at the extruder head are given in Tab. 2.

TABLE 2

| Resin composition and melt pressure at extruder head | | | |
|---|---|---|---|
| Example No. | Elvaloy ® 1224 AC (wt %) | Elvaloy ® PTW (wt %) | Melt pressure (bar) |
| 1 | 0 | 0 | 120 |
| 2 | 5 | 0 | 111 |
| 3 | 0 | 5 | 105 |
| 4 | 1.7 | 0.8 | 140 |
| 5 | 3.4 | 1.6 | 129 |
| 6 | 5.0 | 2.5 | 125 |
| 7 | 6.8 | 3.2 | 111 |

The mechanical properties of the foamed sample are presented in Tab. 3. The impact resistance of the sample serving as a reference provided the values of g-max and HIC as well as average g-max and average HIC, which are written in Tab. 4.

Example 2

The foam extrusion of Example 1 was repeated with the difference that the 5 wt % non-reactive ethylene-methyl acrylate copolymer (Elvaloy® 1224 AC of DuPont™) was added and the amount of PET resin was reduced by 5 wt % of the total throughput. Elvaloy® 1224 AC contained 24 wt % methyl acrylate.

The extrusion process was stable and a PET foam with a fine and uniform cell structure was obtained at a foam density about 100 kg/m³.

The mechanical properties of the foamed sample are presented in Tab. 3.

Example 3

The foam extrusion of Example 1 was repeated with the difference that the 5 wt % reactive ethylene-butyl acrylate-glycidyl methacrylate terpolymer (Elvaloy® PTW of DuPont™) was added and the amount of PET resin was reduced by 5 wt % of the total throughput. Elvaloy® PTW contained 36 wt % butyl acrylate and 6 wt % glycidyl methacrylate.

The extrusion process was stable and a produced PET foam with a fine and uniform cell structure was obtained at a foam density about 100 kg/m³.

The mechanical properties of the foamed sample are presented in Tab. 3.

Example 4

The foam extrusion of Example 1 was repeated with the difference that the 2.5 wt % Elvaloy® 1224 AC/Elvaloy® PTW mixture was added and the amount of PET resin was reduced by 2.5 wt % of the total throughput, whereas the non-reactive/reactive mixture comprised of Elvaloy® 1224 AC and Elvaloy® PTW was composed in a weight ratio of 2:1.

The extrusion process was stable and a PET foam with a fine and uniform cell structure was obtained at a foam density about 100 kg/m³.

The mechanical properties of the foamed sample are presented in Tab. 3, while the impact resistance of the sample was investigated, delivering the values of g-max and HIC as listed in Tab. 4.

Example 5

The foam extrusion of Example 1 was repeated with the difference that the 5 wt % Elvaloy® 1224 AC/Elvaloy® PTW mixture was added and the amount of PET resin was reduced by 5 wt % of the total throughput, whereas the non-reactive/reactive mixture comprised of Elvaloy® 1224 AC and Elvaloy® PTW was composed in a weight ratio of 2:1.

The extrusion process was stable and a produced PET foam with a fine and uniform cell structure was obtained at a foam density about 100 kg/m$^3$.

The mechanical properties of the foamed sample are presented in Tab. 3, while the impact resistance of the sample was investigated, delivering the values of g-max and HIC as listed in Tab. 4.

Example 6

The foam extrusion of Example 1 was repeated with the difference that the 7.5 wt % Elvaloy® 1224 AC/Elvaloy® PTW mixture was added and the amount of PET resin was reduced by 7.5 wt % of the total throughput, whereas the non-reactive/reactive mixture comprised of Elvaloy® 1224 AC and Elvaloy® PTW was composed in a weight ratio of 2:1.

The extrusion process was stable and a PET foam with a fine and uniform cell structure was obtained at a foam density about 100 kg/m$^3$.

Example 7

The foam extrusion of Example 1 was repeated with the difference that the 10% Elvaloy® 1224 AC/Elvaloy® PTW mixture was added and the amount of PET resin was reduced by 10% by weight of the total throughput, whereas the non-reactive/reactive mixture comprised of Elvaloy® 1224 AC and Elvaloy® PTW was composed in a weight ratio of 2:1.

The extrusion process was stable and a PET foam with a fine and uniform cell structure was obtained at a foam density about 100 kg/m3.

The mechanical properties of the foamed sample are presented in Tab. 3, while the impact resistance of the sample was investigated, delivering the values of g-max and HIC as well as average g-max and average HIC as listed in Tab. 4.

TABLE 3

Mechanical properties of expanded polyesters

| Example No. | Density (kg/m$^3$) | Compression strength (MPa) | Shear strength (MPa) | Shear modulus (MPa) | Shear elongation at break (%) |
|---|---|---|---|---|---|
| 1 | 98 | 0.93 | 0.73 | 13.8 | 4.7 |
| 2 | 105 | 0.95 | 0.58 | 13.1 | 15.1 |
| 3 | 101 | 0.71 | 0.69 | 12.4 | 30.0 |
| 4 | 103 | 1.01 | 0.82 | 14.7 | 20.4 |
| 5 | 104 | 1.03 | 0.76 | 14.1 | 26.6 |
| 7 | 106 | 0.93 | 0.74 | 14.3 | 37.3 |

TABLE 4

Impact resistance of expanded polyesters

| Example No. | Maximum acceleration (g-max) | Head injury criteria (HIC) | Average maximum acceleration (Average g-max) | Average head injury criteria (Average HIC) |
|---|---|---|---|---|
| 1 | 101 | 373 | 146 | 628 |
| 4 | 91 | 307 | N/A | N/A |
| 5 | 89 | 304 | N/A | N/A |
| 7 | 92 | 315 | 132 | 516 |

What is claimed is:

1. An expanded polyester material comprising a polymer blend material which comprises:
    a) polyester selected from the group consisting of one or more of PET, PBT and PEN; and
    b) 2 to 20 wt % of an ethylene-acrylate copolymer mixture which comprises
        1) 60-85 wt % of a non-reactive ethylene acrylate resin selected from the group consisting of ethylene butyl acrylate (EBA), ethylene ethyl acrylate (EEA), ethylene methyl acrylate (EMA) and any combination thereof; and
        2) 15-40 wt % of a reactive ethylene acrylate resin selected from the group consisting of ethylene-acrylic ester-maleic anhydride terpolymer (EEAMA), ethylene-ethyl acrylate-glycidyl methacrylate terpolymer (EEA-GMA), ethylene-butyl acrylate-glycidyl methacrylate terpolymer (EBA-GMA) and any combination thereof; said expanded polyester material having a density below 110 kg/m$^3$, a shear elongation at break higher than 20% and a compression strength greater than 0.90 MPa, and wherein said ethylene-acrylate copolymer mixture does not contain pyromellitic acid anhydride (PMDA).

2. The expanded polyester material of claim 1, wherein said polyester is a virgin resin.

3. The expanded polyester material of claim 1, wherein said material is expanded by decompression induced by a change in thermodynamic state.

4. The expanded polyester material of claim 3, wherein said change in thermodynamic state results from a change in pressure or temperature or by a uniaxial or biaxial deformation, elongation or stretching of the melt mixture.

5. An article comprising the expanded polyester material of claim 1 which is thermal insulation, acoustic insulation, structural insulation, a building material, a wall panel, a floor panel, a ceiling panel, a roof panel or a support.

6. An article comprising the expanded polyester material of claim 1.

7. An article comprising the expanded polyester material of claim 1 which is a highly loaded structure.

8. The article of claim 7 which is a windmill blade, a wagon part, an aviation part, an automotive component, or a construction component.

9. The expanded polyester material of claim 1, wherein said polyester is a post-consumer resin.

* * * * *